(12) United States Patent
Son et al.

(10) Patent No.: US 7,430,925 B2
(45) Date of Patent: Oct. 7, 2008

(54) HYBRID TACTILE SENSOR

(75) Inventors: Jae S. Son, Rancho Palos Verdes, CA (US); Tom Parks, Hermosa Beach, CA (US)

(73) Assignee: Pressure Profile Systems, Inc., Los Angeles, CA (US)

( * ) Notice: Subject to any disclaimer, the term of this patent is extended or adjusted under 35 U.S.C. 154(b) by 97 days.

(21) Appl. No.: 11/131,501

(22) Filed: May 18, 2005

(65) Prior Publication Data

US 2006/0260417 A1    Nov. 23, 2006

(51) Int. Cl.
*G01L 1/04* (2006.01)
(52) U.S. Cl. .................................. 73/862.046
(58) Field of Classification Search ............ 73/862.046, 73/862.041
See application file for complete search history.

(56) References Cited

U.S. PATENT DOCUMENTS

| | | | |
|---|---|---|---|
| 3,158,418 A * | 11/1964 | Rush ........................... 439/79 |
| 3,894,329 A * | 7/1975 | Niemirovich, Jr. ......... 228/180.1 |
| 4,196,959 A * | 4/1980 | Chesemore et al. ........... 439/65 |
| 4,555,954 A | 12/1985 | Kim |
| 4,815,990 A * | 3/1989 | Ristedt et al. ................ 439/496 |
| 5,060,527 A | 10/1991 | Burgess |
| 5,261,266 A * | 11/1993 | Lorenz et al. ................. 73/1.15 |
| 5,374,787 A * | 12/1994 | Miller et al. ............. 178/18.06 |
| 5,375,397 A * | 12/1994 | Ferrand et al. .................. 54/66 |
| 5,678,448 A | 10/1997 | Fullen |
| 6,481,294 B2 * | 11/2002 | Zellner et al. .......... 73/862.046 |
| 6,515,586 B1 | 2/2003 | Wymore |
| 6,769,313 B2 | 8/2004 | Weiss |
| 6,826,968 B2 | 12/2004 | Manaresi |
| 6,964,205 B2 * | 11/2005 | Papakostas et al. ..... 73/862.046 |
| 2002/0094701 A1 * | 7/2002 | Biegelsen et al. ............. 439/32 |
| 2003/0136201 A1 * | 7/2003 | Hubbard, Jr. ............. 73/862.41 |
| 2005/0021247 A1 * | 1/2005 | Liu et al. ....................... 702/42 |

FOREIGN PATENT DOCUMENTS

| | | |
|---|---|---|
| JP | 2002-203996 | 7/2002 |
| WO | WO 01/75778 A1 | 10/2001 |
| WO | WO 01/75924 A1 | 10/2001 |

* cited by examiner

*Primary Examiner*—Edward Lefkowitz
*Assistant Examiner*—Punam Patel
(74) *Attorney, Agent, or Firm*—Boris Leschinsky (57) ABSTRACT

A hybrid tactile sensor includes a flexible cloth-based tactile sensor array including a plurality of electrodes, each of the electrodes connected to a corresponding connecting zone of an intermediate connecting harness made from a flexible film such as Kapton®. The harness includes a common bundle of parallel conductors etched or printed onto the harness and connecting each of the connecting zones to a common terminal for further attaching to a control unit of the sensor. The use of the harness allows repeatable manufacturing of sensor arrays with large number of electrodes or when they are located close to each other. Each connecting zone may include an interconnecting pad for crimping, soldering, or adhering the electrode thereto using a conductive epoxy. Alternative embodiments describe the use of U-shaped malleable connectors, jumper wires including those equipped with U-shaped clips, and other means of attaching electrodes to corresponding connecting zones. The use of alternating connections with electrodes of the array allows to double the distance between individual electrodes available for making a connection.

13 Claims, 7 Drawing Sheets

HYBRID TACTILE SENSOR

BACKGROUND OF THE INVENTION

The present invention relates generally to a field of sensors, and, more particularly, to designs and methods of assembly of tactile array sensors used for sensing pressure distribution exerted at various points of a flexible and pliable object. Specifically, the present invention describes the use of a flex harness containing a plurality of interconnect electrodes allowing convenient and repeatable manufacturing of tactile sensors with high number of closely located conductors.

Tactile sensing involves a continuous, variable measuring of tactile force or pressure. In some respects, tactile sensing for electromechanical devices is analogous to the human sense of touch in that information about the amount and distribution of tactile pressure over a surface can be received and transmitted. Not surprisingly, tactile sensing finds great utility in the field of robotics where the tactile sensors provide signals for negative feedback control of servomechanisms and the like. Tactile sensing can provide information about shape, texture, position, orientation, deformation, center of mass, and presence of torque or slippage with respect to an object in contact with the sensor. Other applications of tactile sensing will come to mind to those skilled in the art.

The tactile sensor or tactile sensing transducers can be configured with an array of electrodes to provide a measure of the distribution of tactile pressure over a surface. Ideally, the tactile sensor will have sufficient sensitivity, consistent reproducibility, and high resolution.

One of the known methods employed in tactile sensing is the use of a medium whose electrical properties vary in response to pressure induced deformation. For example, some materials exhibit a piezoresistive effect, i.e. the electrical resistance of the material varies in response to its deformation. Layers of such material sandwiched between two conductive plates will provide a means for detecting pressure when an electrical potential is established between the two plates. The current flowing between them will therefore vary according to the deformation of the intermediate layer resulting from an external pressure forcing the plates closer together. The current will change according to Ohm's Law, such that measuring the current can provide a means for measuring the tactile force applied to the plates. Compression sensitive materials currently in use include for example foamed polymers, which contain conductive fillers such as finely divided particles of metal or carbon. Polyurethane and silicone are also commonly used.

There are also known bi-dimensional capacitive pressure sensors developed primarily for realizing the so called "touch pads" of portable PCs that allow the reconstruction of the position of an object weighing onto the surface of the sensor. U.S. Pat. No. 5,374,787 describes a sensor of the position of such an object onto a sensible surface. These devices are realized with manufacturing techniques of printed circuit boards (PCB), according to which a substrate of fiber-glass or of Mylar® is provided with copper orthogonal stripes defined on one or on the other face of the substrate. Notwithstanding that a substrate of Mylar® or of another dielectric material may be moderately flexible, at least for small deflections, the sensor so constructed remains substantially rigid and not pliable into different geometric shapes. It is evident that these known devices are unsuitable for covering multi-curvature shapes such as a robot fingertip, other organic shapes, or to be incorporated in any object that must retain flexibility and pliability to conform to different shapes as a fabric.

Figure 1A:
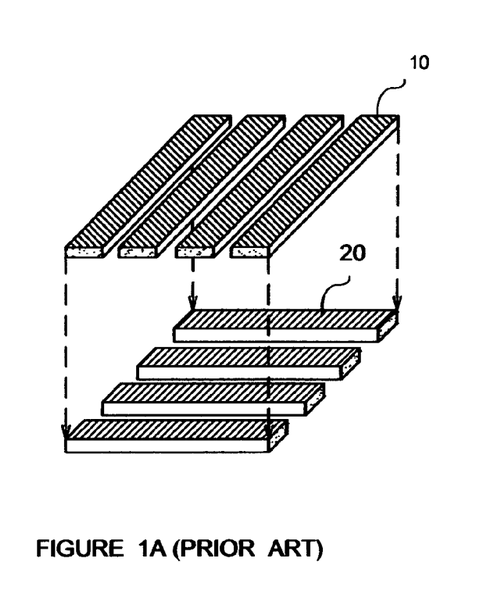
FIGS. 1A and 1B are perspective conceptual drawings of the sensor array formed between two layers of parallel electrodes.
Figure 1B:
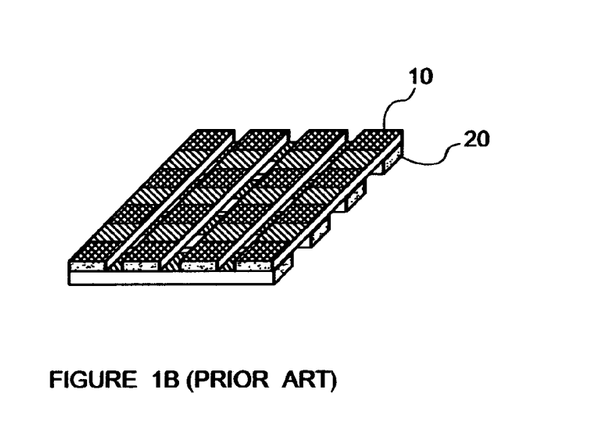

FIG. 1 illustrates the principle of creating a typical cloth-based tactile sensor array. Such device generally consists of a top plurality of parallel electrodes 10 that are placed over the bottom plurality of electrodes 20 with a non-conductive elastic isolation layer therebetween. Both the top 10 and bottom 20 plurality of electrodes can be made of a cloth-based material such as LYCRA™ that can be stretched in one or both X and Y directions. Other materials such as weave fabrics can also be used for this purpose. Individual electrodes can be made as metallized fibers, strands, or yarns that form such cloth or in any other way that is known from the prior art. If soldering is to be used to connect electrodes to the wires of the control unit, the temperature stability of the fabric material should be chosen to allow soldering to take place. In a typical configuration shown on FIG. 1, top electrodes are positioned to be perpendicular to the bottom electrodes forming the intersection areas, which define individual pressure sensors.

The non-conductive material separating the two layers with electrodes is typically chosen to be elastic and compress under the force applied to it within the range of forces estimated to be the working range for each tactile sensor array. For each of the intersection areas in which the top electrode intersects the bottom electrode, a capacitor is therefore formed between the top electrode and the bottom electrode with a compressible non-conductive material therebetween. That capacitor is used as an individual pressure sensor. As the pressure of force is applied to each such sensor, the top electrode is moved closer to the bottom electrode with the compression of the non-conductive material separating the two electrodes. Voltage potential is applied to both the top electrode and the bottom electrode so the capacitance can be measured therebetween. Changing capacitance reflects the degree of pressure or force applied to each sensor in the array. Typically, one plurality of electrodes is designated as a Drive Strip and the other plurality is designated as a Sense Strip. Drive electronics can provide selective measuring of capacitance at any chosen point between these strips of electrical conductors. High speed scanning of all the points in the matrix results in a single data frame reflecting pressure distribution over the surface of the matrix.

As discussed above, flexible tactile sensor arrays can provide useful information about pressure distribution along curved surfaces. Despite the great extent of knowledge developed in the prior art, practical use of tactile cloth-based sensor arrays has been limited until the present time. This is caused by the difficulties in manufacturing the tactile sensor array with more than just a few electrodes. Once the number of electrodes exceeds about 8 on each side of the array (the total of 16), direct attachment of the control unit wires to cloth-based electrodes becomes a burdensome procedure. One great difficulty is managing the large number of wires on both sides of the tactile sensor array and connecting them repeatedly in a reliable manner without intermittent opens and shorts between wires or electrodes.

Another manufacturing difficulty associated with the prior art tactile sensors stems from the high pitch density sensor designs having electrodes located closely together, typically less than only about 3 mm apart. Attaching individual wires to such electrodes becomes difficult as conductive epoxy or solder exhibits a tendency during assembly to deploy over more than one interconnection pad and therefore short the electrical connections.

Various means of terminating the cloth conductors have been described in the prior art. The U.S. Pat. No. 6,826,968 by Manaresi describes a textile-type pressure array sensor adapted to be used on a pliable surface of a flexible object such as a sail. It describes the basic matrix structure of such type of arrays and teaches soldering as a way of terminating the electrodes of the sensor array matrix to a respective pad of the PCB board.

PCT Application No. WO 01/75778 by Swallow et al. describes a pressure-sensitive textile fabric in which the electrodes are incorporated into the flexible fabric itself. Electrode termination is achieved by the use of electrical bus-burs that "may be sewn, embroidered, printed, adhered, mechanically clamped or crimped to the piece of fabric in order to make an electrical contact with the matrix of conductors". The disadvantage of this arrangement is that the rigid bus-bur attached to the edge of the tactile sensor will make this edge itself rigid, loosing the original advantages of the cloth flexibility.

PCT Application No. WO 01/75924 by Sandbach et al. describes a detector made from electrically conductive fabric. Termination of conductive tracks is done with the use of a printing process with electrically conductive ink, or attaching the conductive elements by a conductive adhesive. Although this simplified approach maybe fine for rigid and semi-rigid flex circuit technology, it isn't a reliable solution for pressure array sensors that are flexible due to the substrate flexing under load and damaging the electrically conductive ink or adhesive.

Kim describes a method and apparatus for sensing the tactile forces in his U.S. Pat. No. 4,555,954. The specification mentions the use of a pair of clamping members 26 and 28 to connect the entire electrode strip 18 to the circuit board 12. Again, this termination method makes for a rigid edge of the otherwise flexible tactile sensor.

Japanese Patent No. 2002-203996 describes the pressure array matrix and illustrates the method of electrode termination on FIGS. 3(a) and 3(b). The exact attachment method is not clear from these drawings but appears to use direct wire connection methods described by others.

Wymore discloses a tactile tracking system in his U.S. Pat. No. 6,515,586. Data bus lines and the transmitter 308 are clamped onto the carpet via the use of low profile crimp-on connectors. This conceptual patent fails to provide design specifics needed for creating of a practical device.

Burgess describes a tactile sensing transducer in his U.S. Pat. No. 5,060,527. The silk screen technique is described to illustrate the process of creating electrode lines, that are either bonded using a conductive adhesive or attached to it via pressure from an electrical contact. Disadvantages of these approaches include low reliability and durability in the case of conductive adhesive or the need for pressure from a rigid substrate that holds the electrical contacts to exert the necessary pressure.

Prior art designs have several common disadvantages such as low reliability, bulkiness and/or fabrication difficulties. The need exists for a design allowing simple, reliable and repeatable high volume manufacturing of tactile array sensors having a substantial number of conductors. The need also exists for a design of a tactile array sensor allowing simple and reliable manufacturing of tactile sensors with closely located conductors.

SUMMARY OF THE INVENTION

Accordingly, it is an object of the present invention to overcome these and other drawbacks of the prior art by providing a novel cloth-based hybrid tactile sensor designed to take advantage of both the printed circuit board technology and the flexible cloth-based tactile sensor technology. The novel tactile sensor is specifically adapted for ease and repeatability of high volume manufacturing.

It is another object of the present invention to provide a novel flexible tactile sensor that can be consistently manufactured with large number of electrodes.

It is a further object of the present invention to provide a novel tactile sensor that can be produced with electrodes closely located to each other.

It is yet a further object of the present invention to provide a novel hybrid tactile sensor that can be inexpensively produced in high volumes using routine manufacturing practices.

It is yet another object of the present invention to increase reliability of a tactile sensor as the risk of connector failure is substantially reduced by avoiding a mechanical stress in the connection area.

It is yet a further object of the present invention to increase reliability of the tactile sensor by providing a design of the tactile sensor array with augmented mechanical reinforcement at each electrical connection.

The hybrid tactile sensor of the invention is based on a concept of using an intermediate connecting harness between the electrodes of the cloth-based sensor array and the electronic unit controlling the sensor performance. The invention abandons the approach of directly connecting individual wires to each of the electrodes of the tactile array (as currently done and disclosed in all known devices of the prior art). Instead, an intermediate flexible connecting harness is incorporated into the sensor and is based on a thin non-conductive film (such as Kapton® or Mylar®) with an etched metal coating defining a plurality of intermediate electrical connection lines between individual electrodes of the cloth-based sensor array and the control electronics. A connection zone is assigned to each electrode, which consists in one embodiment of an interconnection pad adapted for example for soldering of an electrode thereto and an opening to pass the electrode through for further increase in the security of the attachment. In other embodiments, provisions are made to allow individual mechanical attachment means to secure the electrodes to their respective interconnection pads. Examples of such individual mechanical attachment means include crimping with U-clips, securing the electrodes with a wedge, applying a rivet or a screw through the interconnection pad to retain the electrode thereon and alike. In other yet embodiments, the geometry of the connection zone is adapted for use of conductive epoxies or other mechanical attachment methods.

The advantage of the hybrid sensor of the present invention is that all electrical connections are neatly laid out throughout the intermediate connecting harness, which ensures that they are well organized and adapted for consistent error-free manufacturing. Long bundles of connecting wires are therefore eliminated to keep the profile of the sensor thin and each electrical connection is made in a way that reduces the risk of failure due to mechanical stresses.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE PREFERRED FIRST EMBODIMENT OF THE INVENTION

A detailed description of the present invention follows with reference to accompanying drawings in which like elements are indicated by like reference letters and numerals. The present invention incorporates into the design of a sensor of an intermediate connecting harness designed to arrange the multitude of electrodes in a manner that makes it convenient for manufacturing. A typical example of such intermediate connecting harness is shown on FIG. 2. It is preferably made of a flexible non-conductive film such as Kapton® or Mylar® covered with electrically conductive thin layer of metal or another appropriate material. Depending on the application and the dimensions of the cloth-based tactile sensor array such as the one generally shown on FIG. 1, the intermediate connecting harness is designed to provide individual electrode connection zones positioned across from and in close vicinity to each corresponding electrode of the sensor array.

Figure 2:
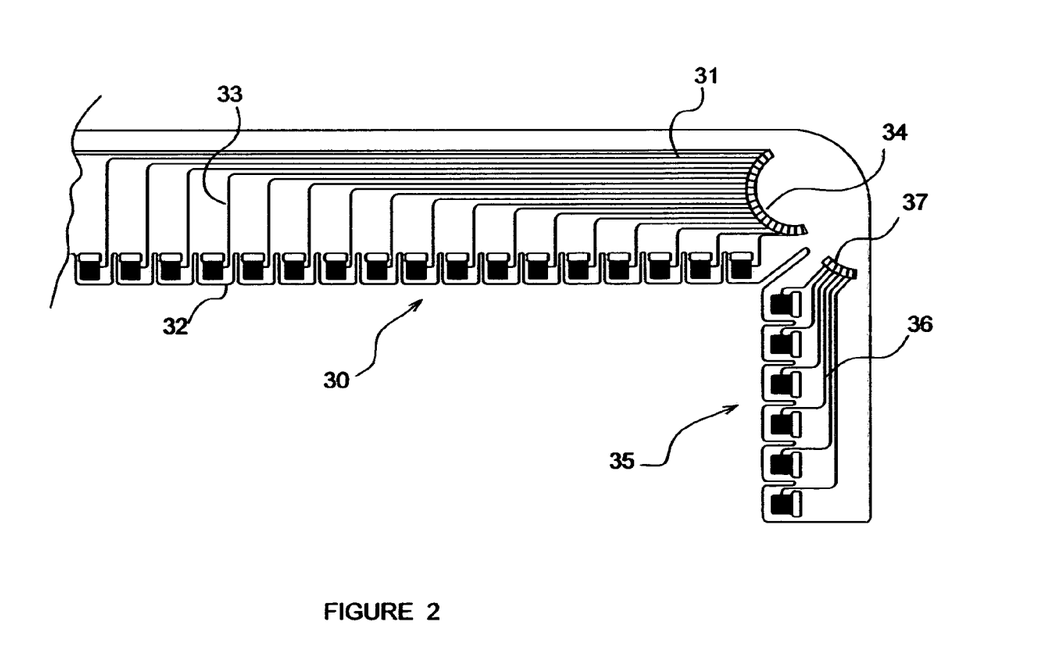
FIG. 2 is a general top view of the intermediate connection harness of the first embodiment of the invention.

FIG. 2 shows an example of the intermediate connecting harness with a first plurality of individual connecting zones 30 on one side of the tactile sensor array and the second plurality of individual connecting zones 35 on an adjacent side of the tactile array. Of course, only one side of the tactile array can be equipped with such harness if desired or both sides can be equipped with separate intermediate connecting harnesses, as dictated by a specific application.

Each connecting zone 32 of the first plurality 30 has provisions for attaching a corresponding electrode of the first or second electrode means of the tactile array (not shown on FIG. 2) to an electrical conductor 33. Conductor 33 is created along the entire harness and leading from the connecting zone away to the area where the harness is attached to the control electronics. Advantageously, the use of Kapton® or Mylar® type films allows convenient etching or printing of the entire conductive pattern on the harness in a single commonly known manufacturing step so that all such conductors are created in parallel with high density and at the same time. A plurality of such conductors forming a common bundle 31 can be positioned along the edge of the harness as shown on FIG. 2 so that each individual conductor 33 has a convenient space to branch off from the common bundle and lead to a corresponding individual connecting zone 32. The common bundles 31 and 36 can be terminated along terminals 34 and 37 respectively. Such terminals are adapted for attaching commercially available cable connectors or even in some cases for direct mounting of at least a portion of control electronics right onto the connecting harness itself. Such terminal can also alternately be used to form an edge connector adapted for further connecting to the electronics cable.

Figure 3:
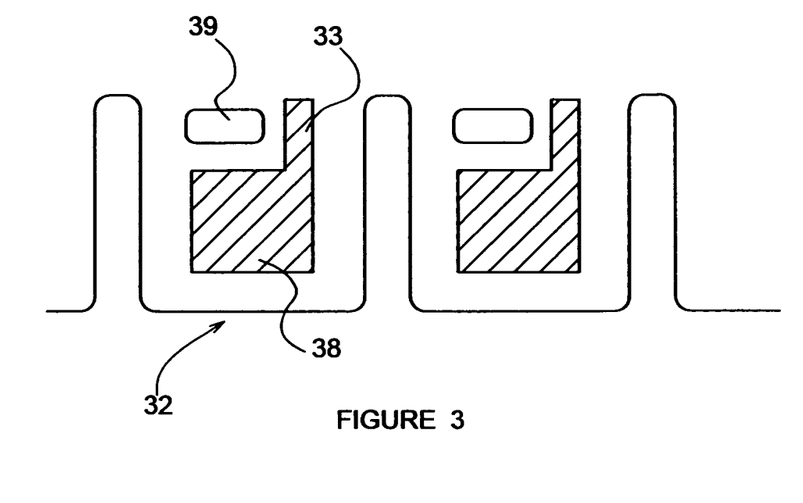
FIG. 3 is an enlarged view of the connection zone of the harness designed to accept individual electrodes of the tactile sensor array, FIGS. 4A and B show in cross-section the use of the U-shaped clip to attach an individual electrode of the tactile sensor array to a respective soldering pad on the connection zone.

FIG. 3 shows a close-up of a connecting zone 32 of FIG. 2 according to the first and most preferred embodiment of the present invention. The size of the connecting zone 32 and the space separating it from the subsequent connecting zone are chosen according to the type of the tactile array. It typically corresponds to the space between individual electrodes of the tactile array so that each electrode can be easily positioned over its corresponding connecting zone. The connecting zone 32 includes an interconnection pad 38 etched together with the conductor 33 and positioned in the front portion of the connecting zone across from the respective electrode of the tactile sensor array (not shown). A slot 39 is also formed through the harness behind the interconnection pad 38 to allow for mechanical crimping of the electrode in place as discussed later.

Figure 4A:
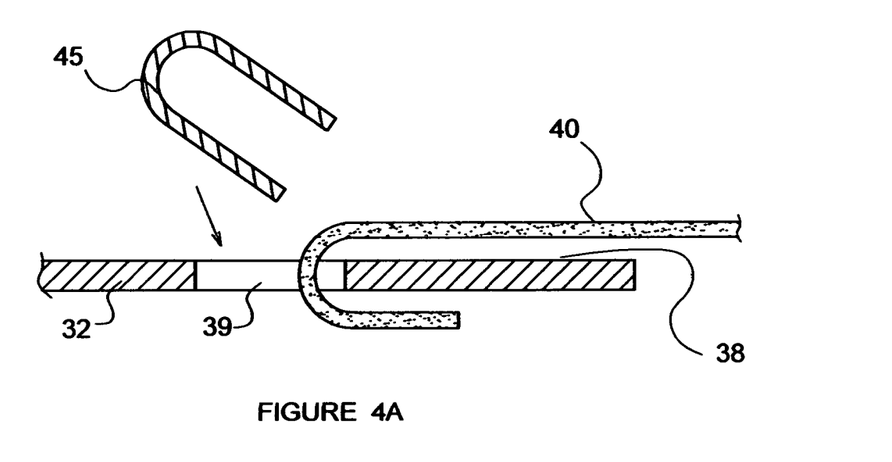
Figure 4B:
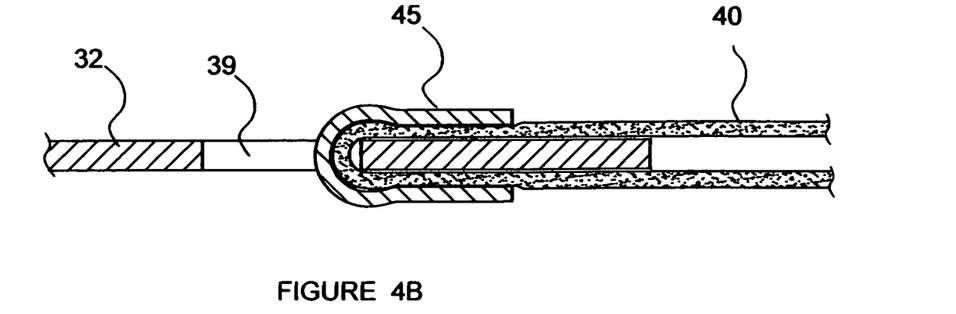

The attachment method of each electrode of the array to the intermediate harness using individual mechanical attachment means is shown in detail on FIGS. 4A and 4B. It includes wrapping of each electrode 40 about the interconnection pad 38 of the connecting zone 32 and through the slot 39 and positioning of the U-shaped malleable connector 45 (serving as one example of such individual mechanical attachment means) over the entire assembly—see FIG. 4A. FIG. 4B illustrates the configuration of the harness in which the U-shaped connector 45 is crimped over the electrode 40 and therefore attached it to the interconnection pad 38 to make the electrical connection between the tactile sensor array and the intermediate harness. Preferably, the U-shaped connector is made from a soft highly electrically conductive metal such as copper or alike so that in addition to the mechanical attachment it also provides for electrical attachment.

To further ensure the quality of electrical connection, application of conductive epoxy in the region of the connection made under the U-shaped connector can be used to secure the connection both mechanically and electrically. Alternatively, soldering of the entire assembly in place can be conducted.

Separate connections are made one by one in a similar manner throughout the intermediate harness on one or both sides of the tactile sensor array to create an attachment between the array and the harness. If required, optional additional mechanical supporting means can be used to hold the array and the harness together, such as clamps and brackets (not shown) but in most cases that is not necessary.

A variation of the first embodiment (not shown on the drawing) would include the use of an H-shaped double-sided forked connector. One side of the connector is placed over the interconnection pad of the connecting zone while the other accepts an individual electrode wedged therein. Such wedge-in connectors are well known for connecting and managing bundles of telephone wires. A properly designed connector can also be used for this application as long as it is equipped with appropriate size slots on both sides thereof. One side should be sized to accept the harness, while the other is separately sized to accept the electrode of the tactile sensor array. The use of this connector may obviate the need for a slot through the harness and wrapping of the electrode about the soldering pad on both sides.

Further useful examples of the individual mechanical attachment means include but not limited to clips, clamps, rivets, screws, wedges, and alike, all designed to retain each individual electrode in contact with the corresponding interconnection pad.

DETAILED DESCRIPTION OF THE PREFERRED SECOND EMBODIMENT OF THE INVENTION

Figure 5:
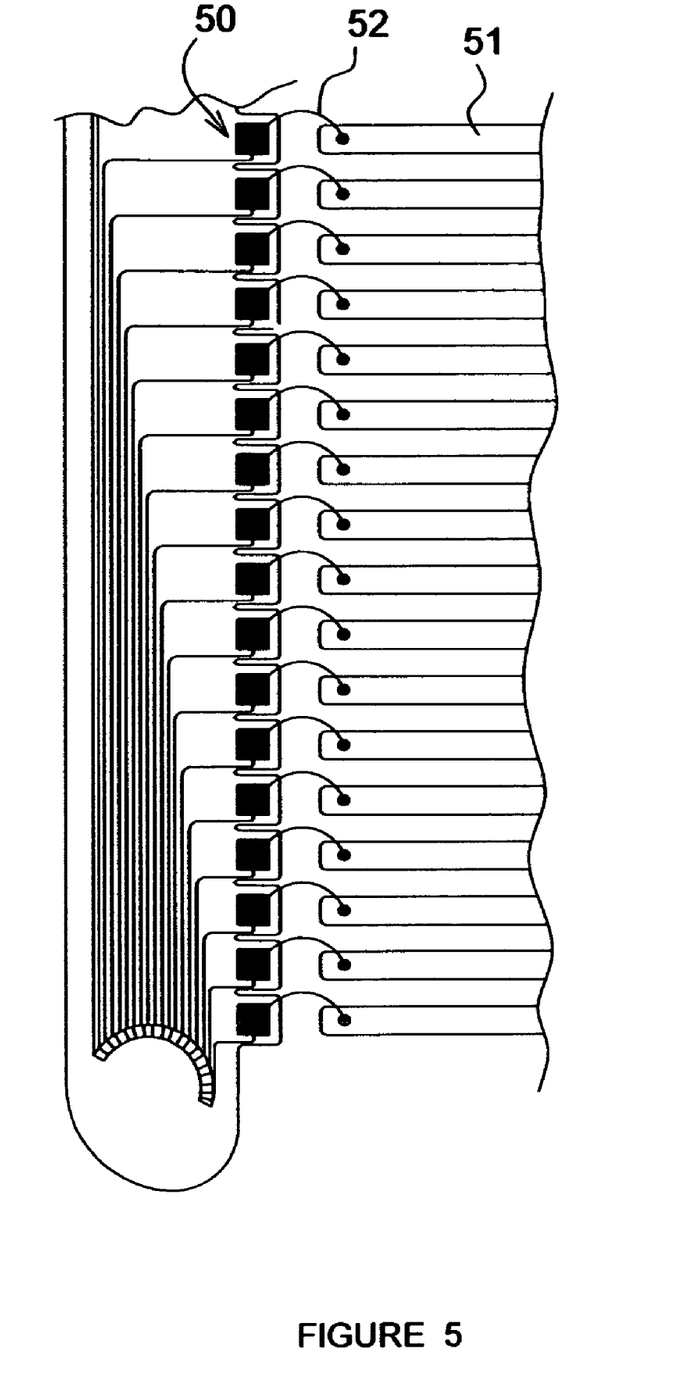
FIG. 5 is an alternative configuration of the intermediate connection harness assembled with the tactile sensor array according to the second embodiment of the invention, FIGS. 6A and B illustrate another alternative connection method between the harness connection zone and the individual electrode of the tactile sensor array according to the third embodiment of the present invention, FIG. 7 illustrate a top view of a hybrid tactile sensor array according to the fourth embodiment of the invention.

An alternative design of the connecting zone is shown on FIG. 5. A one-sided harness is illustrated here having individual connecting zones 50 spaced apart similarly to that described for the first embodiment but without the plurality of slots cut into the harness. Instead, each connecting zone 50 is attached to the electrode 51 of the sensor array cloth by a fine gauge jumper wire 52, which is first soldered to the soldering pad of the connecting zone 50. Such short single strand jumper wires are not difficult to manage.

In cases where the conductive cloth cannot be soldered to because it cannot withstand the soldering temperature, the jumper wire soldered to the interconnect harness pad can be inserted through the conductive cloth and bent over backwards to create a mechanical anchor between the harness and the cloth. Conductive epoxy can then be applied to seal it in place. A non-conductive encapsulation of the entire plurality of attachments can then be optionally applied to further protect the device from mechanical stress and breakage.

DETAILED DESCRIPTION OF THE PREFERRED THIRD EMBODIMENT OF THE INVENTION

A third embodiment of the invention can be advantageously used with the tactile sensor arrays made from fine cloth, which is easily stretched or bent. Another advantage of this embodiment is that it allows attachment to the sensor array with high stretchability. For highly stretchable tactile sensor arrays, one has to take into account that the cloth-based array will stretch in the vicinity of the harness, while the harness itself may not stretch as much. This creates a risk of breaking the electrical contact between electrodes of the array and the conductors of the harness. To avoid that risk, the third embodiment of the invention may include the use of coiled or wavy wires so that they can compensate for the changing distance between the array electrodes and the harness.

Figure 6A:
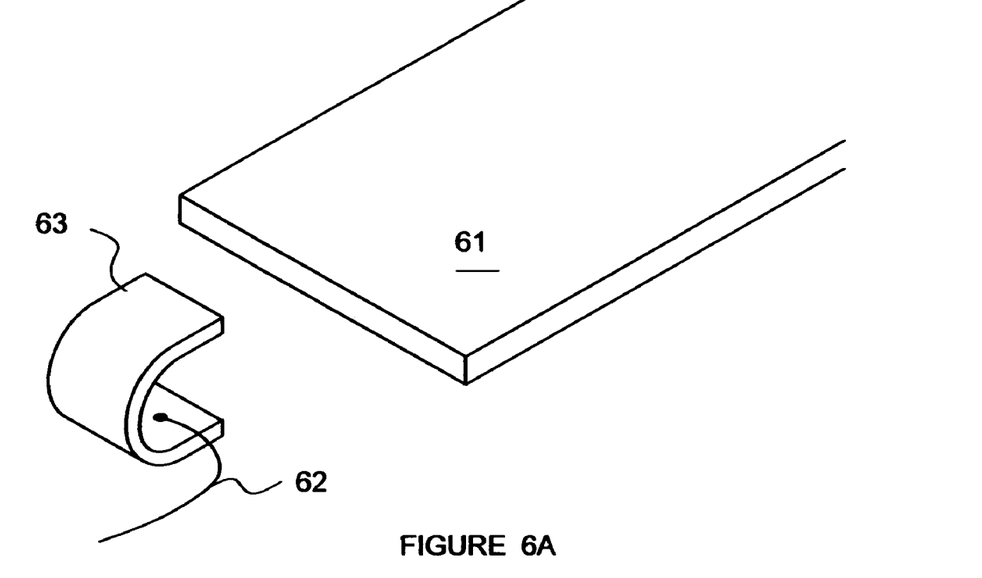
Figure 6B:
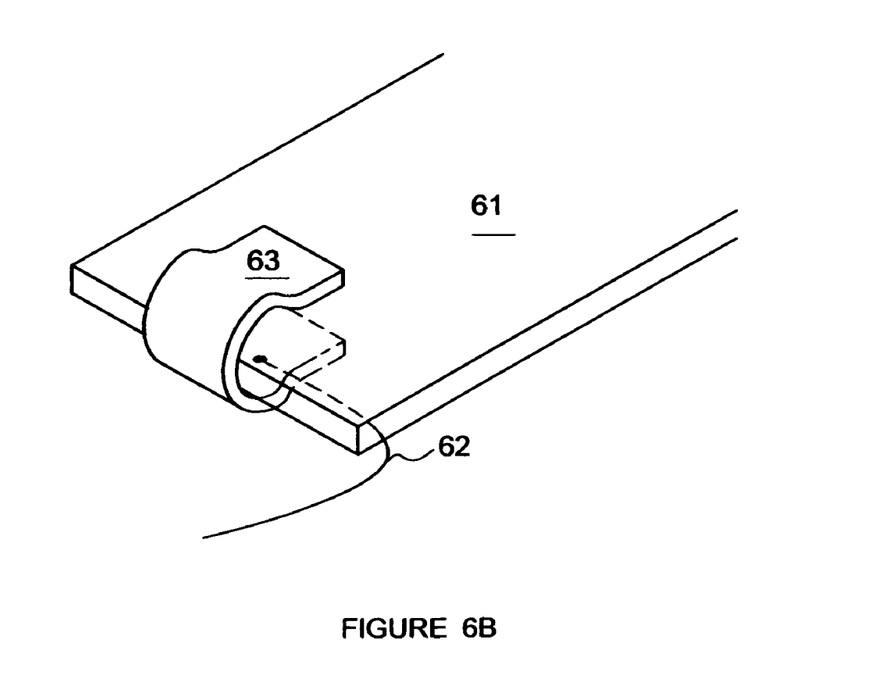

This embodiment may also include the use of a jumper wire 62 attached to a mechanical U-shaped clip 63 as shown on FIG. 6A. Positioning of the clip 63 over the electrode strip 61 allows it to be crimped over the electrode to make the electrical connection as shown on FIG. 6B. Optional soldering or application of the conductive epoxy can be added to ensure the high quality of the electrical contact and mechanical durability of the entire device.

DETAILED DESCRIPTION OF THE PREFERRED FOURTH EMBODIMENT OF THE INVENTION

Figure 7:
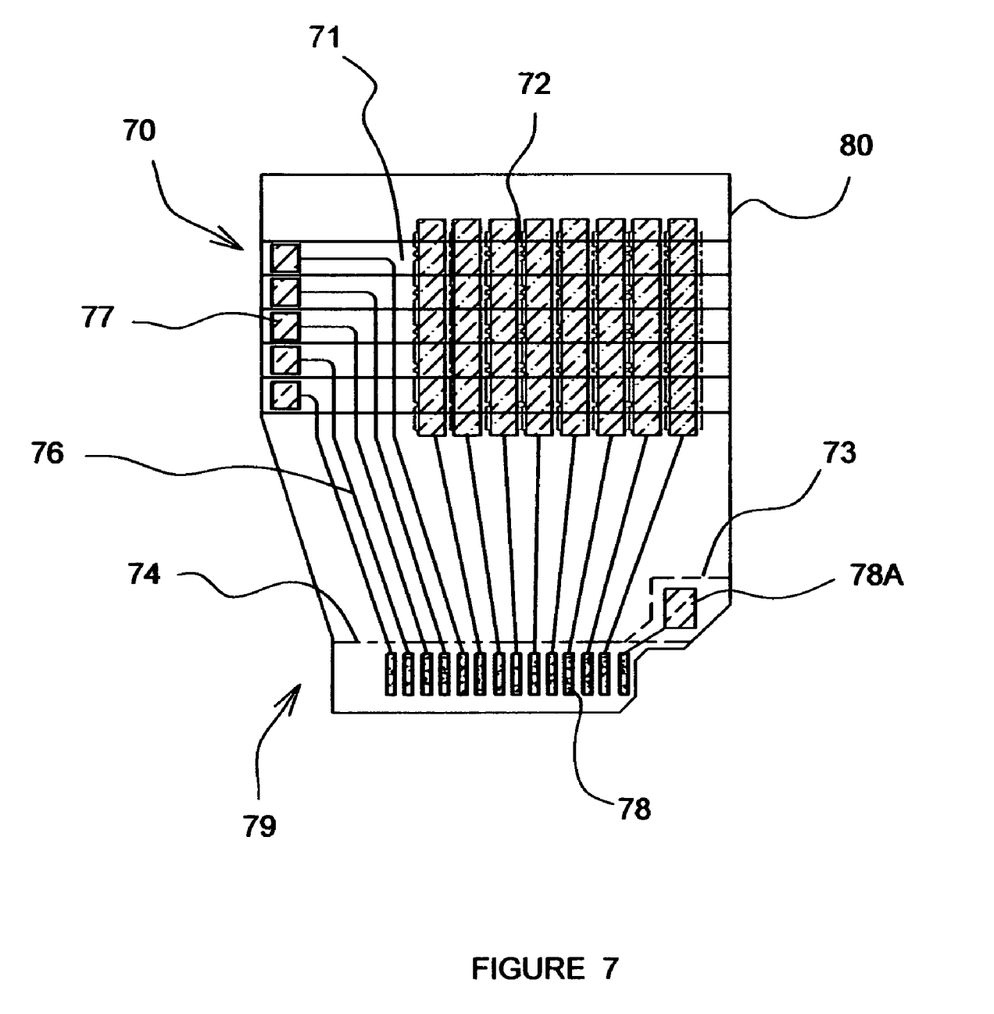

FIG. 7 illustrates the hybrid tactile sensor array according to the fourth embodiment of the invention. This embodiment can be used with particular advantage in high volume production of the tactile sensors in banks, each bank containing a plurality of such sensors being worked on at the same time. It is also advantageous for those applications that can benefit from the use of conductive cloth-based tactile sensor array for the physical contact side of the device while the other side is made by extending the intermediate harness connection pad into an electrode strip.

This embodiment of the hybrid sensor is based upon the use of a conductive cloth 70 in which a series of parallel first electrodes 71 are formed by cutting or another appropriate separation method. In FIG. 7 these electrodes are shown to be horizontally oriented.

The compliant dielectric non-conductive medium, in this case strips 72, is attached to the conductive cloth. The sensor also includes an insulating layer 73 between the conductive cloth shield layer 74 and the first electrodes 71. Areas where the conductive shield material 74 will be connected to electrical ground are cut out (for example by using a steel rule die).

The traces 76 and second electrodes are formed by etching or printing onto the intermediate connecting harness 79, which in this case extends to cover the entire area of the tactile sensor array. The traces 76 include terminating pads 77 for connecting to the conductive cloth first electrodes 71, as well as edge connectors 78 for connecting to the electronics and a grounding pad 78A to ground the shield. The intermediate connecting harness 79 may be attached to the conductive cloth 70 using bonding or another similar attachment method, thereby forming a tactile sensor array. First electrodes 71 are attached to the terminating pads 77 using any of the above-described methods or individual connection between electrodes and the intermediate harness. The final tactile array is then cut along the outline 80, either individually or from a bank of similar subassemblies.

DETAILED DESCRIPTION OF THE PREFERRED FIFTH EMBODIMENT OF THE INVENTION

A logical extension of the previous embodiment of the invention is to extend not only one sided intermediate connecting harness to form a set of electrodes on one side of the tactile sensor array, but also to extend the second intermediate connecting harness to form a second set of electrodes on the other side of the matrix. Therefore, combining two intermediate connecting harnesses forms the entire tactile sensor array device, each harness having extended conductors forming the electrodes of the sensor array. Additional provisions of such device that can be applicable to this and other embodiments of the present invention include creating slits along the array area in order to improve the flexibility of the assembly. The advantages of this design include a minimal sensor thickness and inherent formation of the shielding around the sensor area.

DETAILED DESCRIPTION OF THE PREFERRED SIXTH EMBODIMENT OF THE INVENTION

Figure 8:
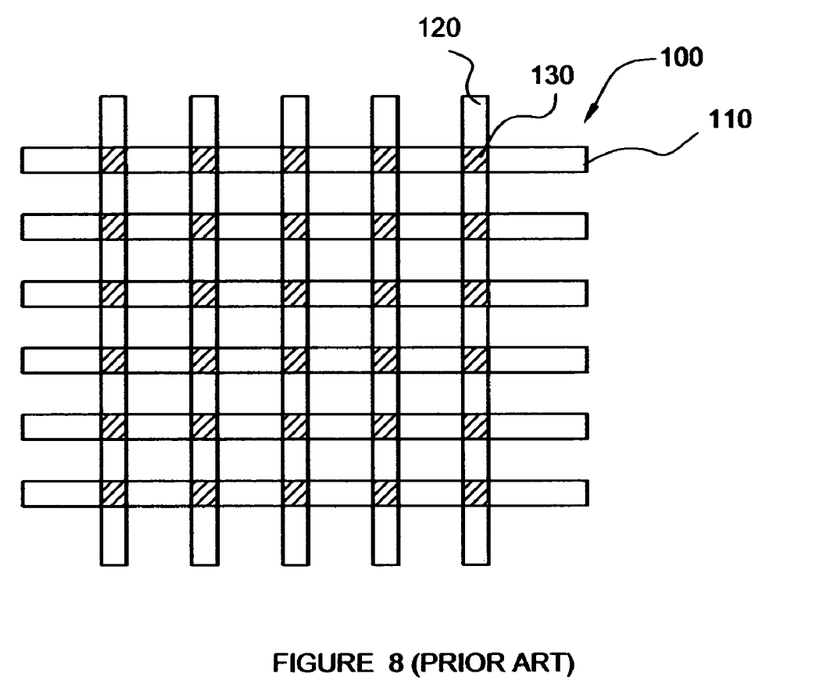
FIG. 8 shows a typical arrangement of electrodes of the tactile sensor array.
Figure 9:
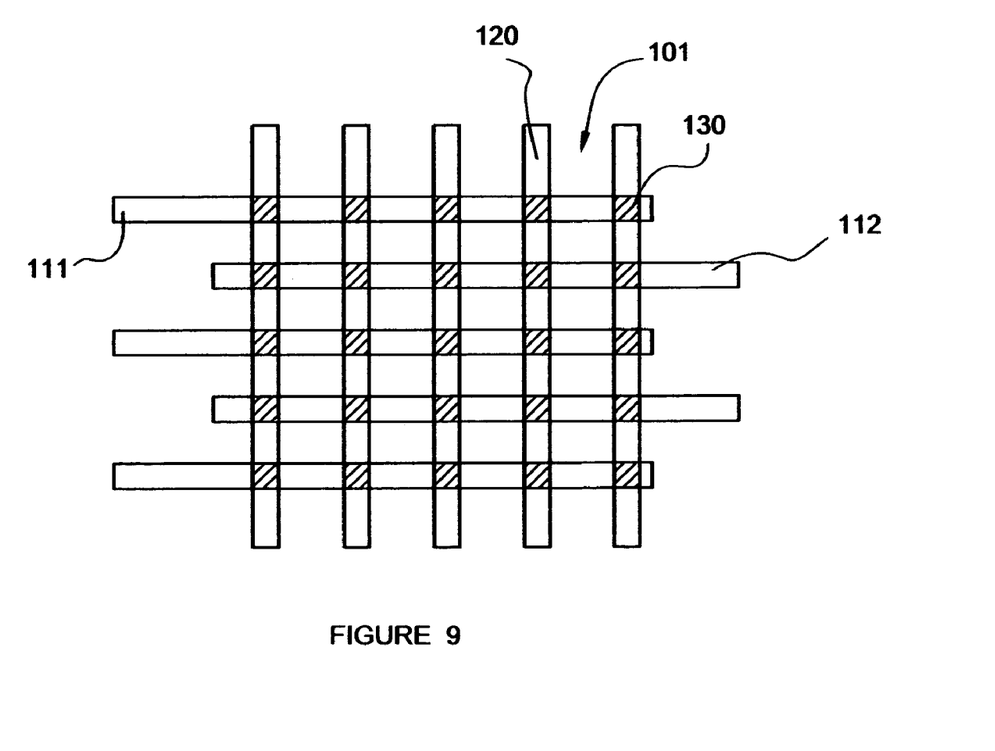
FIG. 9 shows an arrangement of electrodes according to the sixth embodiment of the invention in which the first plurality of electrodes form alternating electrodes extending on both sides of the tactile array.
Figure 10:
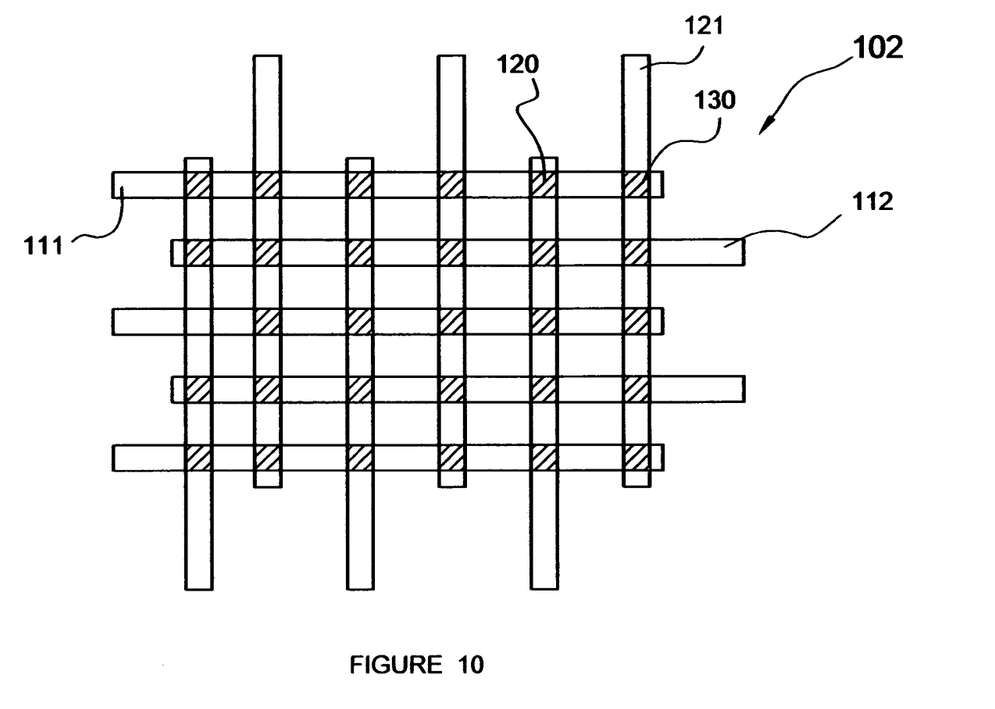
FIG. 10 is a further variation of the sixth embodiment of the present invention in which both the first and the second plurality of electrodes form alternating electrodes extending on all four sides of the array.

Further improvements to the sensor design constitute the sixth embodiment of the present invention and are shown on FIGS. 8 through 10. They are designed to further improve the high volume manufacturing process and are specifically beneficial in producing tactile sensor arrays with high density of electrodes, especially if the distance between adjacent electrodes is less than about 3 mm.

FIG. 8 shows a typical sensor array 100 in which the individual pressure sensors 130 are formed at intersections between the first plurality of parallel electrodes 110 and the second plurality of parallel electrodes 120. In the process of terminating the electrodes with an interconnecting harness or with conventional means as described in the prior art, one side of the first and second plurality of electrodes is trimmed while the other side is attached to the control electronics. When the distance between adjacent electrodes is small, making a connection to each individual electrode becomes difficult.

The concept behind the sixth embodiment of the invention is to use both sides of each of the plurality of electrodes to make electrical connections to every other electrode. The first plurality of electrodes of the tactile sensor array 101 in FIG. 9 is shown with alternate trim such that the first side of the electrodes 111 presents only one of every two electrodes extending beyond the array area and adapted for termination. The second side of the same plurality of electrodes presents the other electrodes 112 extending on the other side and available for electrical connection. In this case, the distance between the electrodes is essentially twice that of the same array terminated conventionally. Two intermediate connecting harnesses can be used on both sides of the array 101 to terminate alternate electrodes 111 and 112.

FIG. 10 shows an array 102 in which both the first and the second plurality of electrodes are design with the feature of alternate terminating. In this figure, the first plurality of electrodes are divided into the first side electrodes 111 alternating with the second side electrodes 112 and extending beyond the array area on both sides for further steps of electrical connection. Similarly, the second plurality of electrodes is divided into the third side electrodes 120 alternating with the fourth side electrodes 121. For this array, four intermediate connecting harnesses may be used on each side of the array. Alternately, a combined intermediate connecting harness may be used in which four bundles of conductors are arranged to terminate electrodes on all four respective sides of the tactile sensor array.

Although the electrodes on FIG. 9 and 10 are shown to be trimmed to allow alternate termination of every other electrode, it is also contemplated that other means of electrode isolation can be used such as masking, bending backward, insulating with polymer, and alike.

DETAILED DESCRIPTION OF THE PREFERRED SEVENTH EMBODIMENT OF THE INVENTION

One additional aspect of the invention allowing advantageous use of the intermediate connecting harness is the placement of all the interconnections associated therewith on the back side of a rigid substrate that the flexible tactile sensor array sensor is mounted on. Typically such backside provides excellent mechanical protection for the connections of the array electrodes since typically it is enclosed in its own housing with an optional cover separating the sensor electronics from contacting the outside environment.

Since tactile array sensors typically have two orthogonal rows of interconnections, one of the electrodes may be formed by enlarging the interconnection pad to form one side of an electrode, which is mounted to the rigid support substrate with an adhesive transfer film or adhesive. The other side of the electrode made out of conductive cloth is wrapped around the rigid substrate that the interconnections occur on the back side where it is protected. To facilitate the use of conductive epoxy the side in which the electrode wraps around the substrate can be alternated such that the interconnection points have more space between them to prevent shorting and aid in fabrication process.

Figure 11:
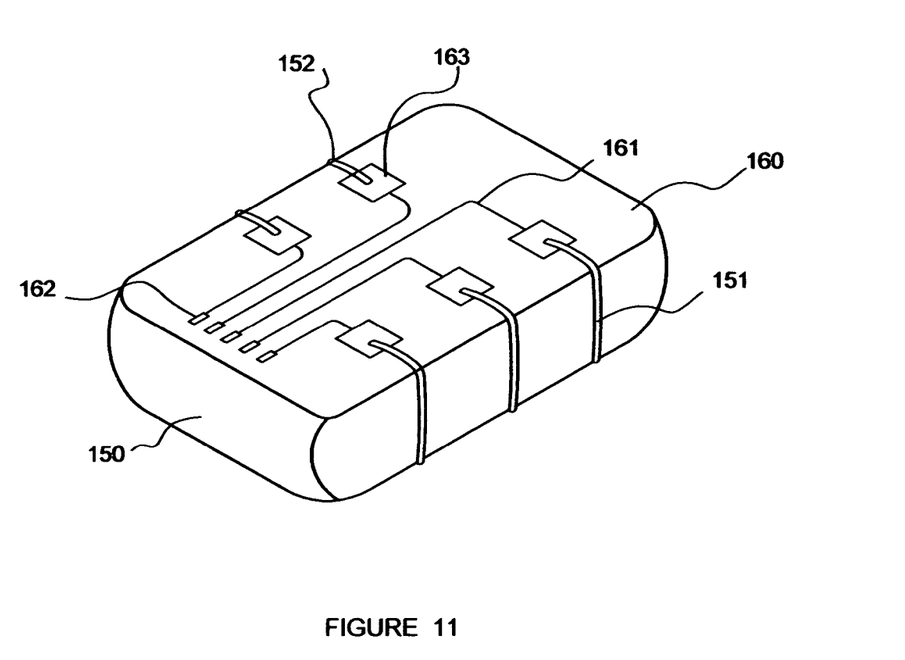
FIG. 11 shows a seventh embodiment of the invention in which the tactile sensor array is wrapped about a rigid substrate and the single interconnecting harness is connected to the alternating electrodes wrapped about two sides of the sensor.

A typical arrangement of such a sensor is shown on FIG. 11. The rigid substrate 160 is located on the back of the cloth-based sensor array 150. Alternating electrodes 151 and 152 are shown extending beyond the array area to be wrapped around the sensor and connected to a single intermediate connecting harness formed on the rigid substrate 160. The intermediate connecting harness comprises a bundle of conductors 161 connecting the interconnection pads 163 to the terminal 162. Note that the use of a flexible intermediate connecting harness is just one of the most preferred configurations utilizing the concept behind this embodiment of the invention. Alternatively, the rigid substrate 160 can incorporate the electrical conductors 161 therein without the use of a flexible non-conductive film defining a connecting harness. This embodiment provides especially durable and reliable design for the hybrid tactile sensor of the present invention as it protects the sensor from mechanical stresses in the area where electrical connections are made.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A hybrid tactile sensor comprising:
    a flexible tactile sensor array incorporating a first electrodes means overlapping a second electrodes means with a non-conductive compressible isolation therebetween, at least one of said first or second electrodes means comprises plurality of parallel electrodes within a conductive cloth, and
    an intermediate connecting harness formed by a flexible non-conductive film and a conductive layer attached thereto, said flexible non-conductive film including a plurality of connecting zones, each of said connecting zones located adjacent to and adapted to be connected to the corresponding electrode of at least a portion of said first or said second electrodes means, said conductive layer including a plurality of conductors, each conductor originating from a corresponding connecting zone, said conductors extended to a common terminal.

2. The hybrid tactile sensor as in claim 1, wherein each of said connecting zones including a jumper wire attached to a corresponding conductor originating from said connecting zone, whereby said jumper wire connects said harness and said flexible tactile sensor array.

3. The hybrid tactile sensor as in claim 2, wherein said jumper wire includes a strain-relief coil.

4. The hybrid tactile sensor as in claim 1, wherein said intermediate connecting harness extending throughout said tactile sensor array, said conductors extending beyond said connecting zones and forming said first or said second plurality of parallel electrodes.

5. The hybrid tactile sensor as in claim 1 further including a rigid substrate supporting said tactile sensor array on one side of said substrate and supporting said intermediate connecting harness on the other side thereof.

6. The hybrid tactile sensor as in claim 1, wherein said first plurality of parallel electrodes comprising a first side plurality of electrodes and a second side plurality of electrodes, said electrodes of said first side plurality alternating with said electrodes of said second side plurality, said electrodes of said first side plurality of electrodes extending on a first side of said sensor array and outside thereof for connecting to said intermediate connecting harness, said electrodes of said second side plurality of electrodes extending on a second side of said sensor array outside thereof and opposite said first side, whereby increasing space between adjacent electrodes to facilitate electrical connections thereto.

7. The hybrid tactile sensor as in claim 6 further including a rigid substrate supporting said tactile sensor array on one side of said substrate and supporting said intermediate connecting harness on the other side thereof, said first side plurality of electrodes wrapped about said substrate and connected to said intermediate connecting harness on said first side of said sensor, said second side plurality of electrodes wrapped about said substrate and connected to said intermediate connecting harness on said second side of said sensor, whereby said flexible tactile sensor away is wrapped around said rigid substrate on said first and said second sides of said sensor.

8. The hybrid tactile sensor as in claim 1, wherein said conductive cloth has a thickness exceeding that of a single electrode of said plurality of electrodes.

9. The hybrid tactile sensor as in claim 1, wherein said conductive cloth has a thickness of at least two times greater than that of a single electrode of said plurality of electrodes.

10. A hybrid tactile sensor comprising:
a flexible tactile sensor array incorporating a first plurality of parallel electrodes overlapping a second plurality of parallel electrodes with a non-conductive isolation therebetween, at least one of said first or second plurality of electrodes comprises a conductive cloth,
a first intermediate connecting harness formed by a flexible non-conductive film and a conductive layer attached thereto, said flexible non-conductive film including a first plurality of connecting zones, each of said connecting zones located adjacent to and adapted to be connected to the corresponding electrode of at least a portion of said first plurality of parallel electrodes, said conductive layer including a first plurality of conductors, each conductor originating from a corresponding connecting zone, said first plurality of conductors extended to a first common terminal, and
a second intermediate connecting harness formed by a flexible non-conductive film and a conductive layer attached thereto, said flexible non-conductive film including a second plurality of connecting zones, each of said connecting zones located adjacent to and adapted to be connected to the corresponding electrode of at least a portion of said second plurality of parallel electrodes, said conductive layer including a second plurality of conductors, each conductor originating from a corresponding connecting zone, said second plurality of conductors extended to a second common terminal.

11. A hybrid tactile sensor comprising a flexible tactile sensor array incorporating a first plurality of parallel electrodes overlapping a second plurality of parallel electrodes with a non-conductive isolation therebetween, at least one of said first or second plurality of electrodes comprises a conductive cloth, said first plurality of parallel electrodes comprising a first side plurality of electrodes and a second side plurality of electrodes, said electrodes of said first side plurality alternating with said electrodes of said second side plurality of electrodes, said electrodes of said first side plurality of electrodes extending on a first side of said sensor away beyond thereof, said electrodes of said second side plurality of electrodes extending on a second side of said sensor away beyond thereof, said second side being opposite said first side, whereby increasing space between adjacent electrodes on each side to facilitate attaching electrical connections thereto, said hybrid tactile sensor further including a rigid substrate supporting said tactile sensor array on one side of said substrate, said first side plurality of electrodes wrapped about said rigid substrate from said first side of said sensor, said second side plurality of electrodes wrapped about said rigid substrate from said second side of said sensor.

12. A hybrid tactile sensor comprising:
a flexible tactile sensor away incorporating a first plurality of parallel electrodes overlapping a second plurality of parallel electrodes with a non-conductive isolation therebetween, at least one of said first or second plurality of electrodes comprises a conductive cloth, and
an intermediate connecting harness formed by a flexible non-conductive film and a conductive layer attached thereto, said flexible non-conductive film including a plurality of connecting zones, each of said connecting zones located adjacent to and adapted to be connected to the corresponding electrode of at least a portion of said first or said second plurality of parallel electrodes, said conductive layer including a plurality of conductors, each conductor originating from a corresponding connecting zone, said conductors extended to a common terminal, each of said connecting zones including an interconnection pad formed in said conductive layer together with said conductor originating therefrom.

13. The hybrid tactile sensor as in claim 12, wherein each of said connecting zones including a slot sized to accept said electrode passed therethrough, each of said connecting zones further including a malleable U-shaped connector adapted to pass through said slot over said electrode and said connecting zone and crimp said electrode to said interconnection pad.

* * * * *